(12) United States Patent
Chen et al.

(10) Patent No.: US 8,551,295 B2
(45) Date of Patent: Oct. 8, 2013

(54) REACTIVE DISTILLATION APPARATUS FOR A MULTISTAGE COUNTER-CURRENT ROTATING BED AND ITS APPLICATION

(75) Inventors: Jian-Feng Chen, Beijing (CN);
Peng-Yuan Zhang, Beijing (CN);
Guang-Wen Chu, Beijing (CN);
Hai-Kui Zou, Beijing (CN); Wei Wu,
Beijing (CN); Qin Shi, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 314 days.

(21) Appl. No.: 12/990,454

(22) PCT Filed: Jun. 12, 2010

(86) PCT No.: PCT/CN2010/073915
§ 371 (c)(1),
(2), (4) Date: Oct. 29, 2010

(87) PCT Pub. No.: WO2011/094984
PCT Pub. Date: Aug. 11, 2011

(65) Prior Publication Data
US 2011/0214979 A1 Sep. 8, 2011

(30) Foreign Application Priority Data
Feb. 5, 2010 (CN) .......................... 2010 1 0108702

(51) Int. Cl.
*B01D 3/00* (2006.01)
*B01J 4/00* (2006.01)
*B01J 8/02* (2006.01)

(52) U.S. Cl.
USPC ............. 202/238; 202/236; 203/29; 422/312; 422/608; 422/610; 422/612; 422/618

(58) Field of Classification Search
USPC ........ 202/236, 238; 203/29, DIG. 6; 422/236, 422/238, 312, 608, 610, 612, 618
See application file for complete search history.

(56) References Cited

U.S. PATENT DOCUMENTS 3,693,086 A * 9/1972 Redecker et al. ............. 324/155
3,844,725 A * 10/1974 Nenicka .......................... 23/300

(Continued)

FOREIGN PATENT DOCUMENTS

| CN | 1415396 A | 5/2003 |
|---|---|---|
| CN | 201260790 Y | 6/2009 |
| CN | 101549274 A | 10/2009 |

OTHER PUBLICATIONS

International Search Report of International application No. PCT/CN2010/073915, dated Nov. 11, 2010.

*Primary Examiner* — Virginia Manoharan
(74) *Attorney, Agent, or Firm* — J.C. Patents

(57) ABSTRACT

A reactive distillation apparatus for multistage counter-current rotating bed includes a closed shell, in the center of which a revolving shaft linking each shell section is set, the shaft is provided with two or more rotors in series connection, a feeding inlet, a reflux inlet and an outlet of the gas phase are mounted on the top end face of the shell while a waste liquid outlet and an inlet of the gas phase are set on the bottom end face of the shell, a group of concentric dynamic filler rings with different diameters are installed at intervals along the radial direction, wherein the wall of the dynamic filler rings is holed, and the ring clearance between the dynamic filler rings is configured with static rings fastened on the static disc; a feeding inlet is arranged on the top cover of the shell corresponding to the spray nozzle of raw material liquid; a rotating liquid distributor is arranged on the inner side of the innermost dynamic filler ring of the said lower rotor.

10 Claims, 2 Drawing Sheets

(56) References Cited

U.S. PATENT DOCUMENTS

| | | | |
|---|---|---|---|
| 4,005,817 A * | 2/1977 | Charlton et al. | 494/10 |
| 4,952,374 A | 8/1990 | Baillie | 422/110 |
| 5,201,441 A * | 4/1993 | Hoppe et al. | 222/368 |
| 2004/0261618 A1 * | 12/2004 | Babicki et al. | 95/113 |
| 2007/0238839 A1 * | 10/2007 | de Broqueville | 526/59 |

* cited by examiner

REACTIVE DISTILLATION APPARATUS FOR A MULTISTAGE COUNTER-CURRENT ROTATING BED AND ITS APPLICATION

BACKGROUND OF THE INVENTION

1. Technical Field

The present invention relates to a gas-liquid contact apparatus, and more especially, to a reactive distillation apparatus for multistage counter-current rotating bed and its application which can be widely applied in absorption, distillation, reactive distillation, catalytic distillation, purification and preparation of the nano materials in the fields such as chemical, petrochemical, pharmaceutical and light industry.

2. Description of Related Art

Reactive distillation is a chemical operation process that couples the chemical reaction and the distillation process in the same equipment, which is more and more widely applied in chemical industry. Comparing with traditional reaction and distillation technology, the reactive distillation technology has obvious advantages: (1) Reaction and distillation processes are completed in the same equipment, thus lowering investment and operation costs, and conserving energy; (2) The simultaneous implementation of the reaction and distillation not only improves the distillation property, but also increases the reaction conversion and selectivity with the aid of the separation of the distillation; by immediately moving away the reaction product, it can overcome the limit of the chemical equilibrium conversion of the reversible reaction or increase the selectivity of consecutive or parallel reaction; (3) Easy to control temperature to prevent a hot spot; (4) Shorten the reaction time and improve the productivity. However, since the reactive distillation is accompanied with a chemical reaction, separation and interaction with a violent reaction, it complicates the engineering design of the process and affects many aspects. Moreover, most reactive distillation technologies studied at present draw on the experience of the traditional column form, restricted by the Earth gravity field, the mass-transfer efficiency is hard to improve greatly, thus limiting the application of the reactive distillation technology. Conducting deeper research about the reactive distillation technology, developing a new process based on the reactive distillation technology to replace many backward production processes domestically and developing an equipment structure and catalyst component with independent intellectual property have become important issues in the evolvement of the reactive distillation technology.

High gravity technology is a breakthrough technology to enhance transmission and heterogeneous reaction processes by means of the properties of the highly-enhanced mass transfer process in a high gravity environment and the homogeneous micromixing process so as to replace the chemical column equipment tens of meters high with the high gravity machine which is lower than two meters. Thus, the high gravity rotating bed is known as "the transistor of the chemical industry". The high gravity rotating bed overcomes the shortcomings of the traditional column equipment. Under the action of centrifugal force hundreds of times or thousands of times higher than the gravity field of the Earth, the liquid phase flows to the outer ring in the form of liquid drops, liquid film and liquid filament on the filler surface. Then the wet area of the carrier increases, the liquid mixes evenly, the interfacial area increases and updates quickly, thus leading to the interphase mass transfer speed ratio up by 1-3 orders of magnitude in comparison to the traditional column. In this way, the mass transfer, heat transfer and the reactive process controlled by the liquid phase are greatly enhanced, the unit height of the mass transfer reduces by 1-2 orders of magnitude and many advantages not available in the traditional equipment are demonstrated.

BRIEF SUMMARY OF THE INVENTION

The present invention puts forward a reactive distillation apparatus for multistage counter-current rotating bed and its application, wherein the catalyst as the filler of the rotating bed not only plays the role of catalyst, but also increases the interphase mass transfer area; the present invention aims at combining the advantages of the high gravity technology and the reactive distillation technology so as to greatly improve the mass-transfer efficiency and the separation efficiency of the reactive distillation process.

The technical solution adopted in the present invention is as below:

A reactive distillation apparatus for multistage counter-current rotating bed, comprising a closed shell, in the center of which a revolving shaft linking each shell is set, the said shaft is provided with two or more rotors in series connection, a feeding inlet, a reflux inlet and an outlet of gas phase are mounted on the top end face of the shell while a waste liquid outlet and an inlet of gas phase are set on the bottom end face of the shell, the said shell consists of a upper section of the shell and a lower section of the shell along the axial direction, the said rotor consists of a rotating disc firmly connecting with the revolving shaft and a static disc mounted to the shell. A group of concentric dynamic filler rings but with different diameters are set at intervals along the radial direction, wherein the wall of the dynamic filler rings is holed, the ring clearance between the dynamic filler rings is configured with static rings fastened on the static disc, wherein the wall of the static rings has holes ; the filler filled in the said dynamic filler ring includes a catalytic filler and a wire gauze filler with the catalytic filler filled in the dynamic filler ring of the outer circle of the upper rotor and the inner circle of the lower rotor, and the wire gauze filler filled in the rest dynamic filler rings, to make the whole rotor structure equivalent to the distillation section, reactive distillation section and stripping section; a spray nozzle with raw material liquid is arranged between the catalytic filler ring of the upper rotor and the wire gauze filler ring, a spray nozzle of reflux is arranged in the inner circle of the innermost dynamic filler ring; a rotating liquid distributor is arranged in the inner circle of the innermost dynamic filler ring of the said lower rotor.

Furthermore, the upper & lower rotors in series connection installed on the said revolving shaft are respectively located in the upper section of the shell and the lower section of the shell.

Furthermore, when there are two rotors, the catalytic filler is filled in the dynamic filler ring of the outer circle of the upper rotor and the inner circle of the lower rotor, the wire gauze filler is filled in the rest dynamic filler rings; when there are more than two rotors, the catalytic filler is filled in the dynamic filler ring in the middle while the wire gauze filler is filled in the first & last dynamic filler ring.

Furthermore, the said catalytic filler is the catalyst of solid acid filled in the net bag made from the porous media to form the catalyst component.

Furthermore, the said porous media can be glass fiber, polyester or nylon yarn, polytetrafluoroethylene braiding, cotton and the wire gauze of the aluminum, copper, stainless steel and other materials.

Furthermore, a feeding inlet on the top end face of the said shell is arranged between the catalytic filler ring and the wire gauze filler ring of the upper rotor, corresponding to the spray nozzle location of the said raw material liquid.

Furthermore, the porosity of the wire gauze filler in the dynamic filler ring is 50%-99%, preferably 90%-98%. The porosity of the wall of the static ring is 40%-95%, preferably 60%-65%.

The favorable effects of the present invention are as follows: 1. With the gas-liquid contact elements of the rotor of the rotating bed being several groups of the concentric dynamic filler rings and the static rings but having different diameters and with a holed wall, the gas-liquid media increase the flow area of the gas-liquid, reduce the flow resistance of the gas-liquid when passing through the rotor, and the liquid flooding is not easy to occur, thus increasing the gas-liquid connection quantity and the multistage counter-current contact of the gas-liquid media; 2. The fillers in the dynamic filler rings respectively adopt the catalytic filler and wire gauze filler, thus realizing the combination of the high gravity technology and the reactive distillation technology, making the wire gauze filler ring of the rotor structure of the rotating bed, catalytic filler ring and wire gauze filler ring corresponding to the distillation section, reactive distillation section and the stripping section of the traditional distillation column with the rotating bed replacing the reactive distillation column, in this way, solving the shortcomings of the traditional column equipment, leading to the full contact of the raw materials in the forms of gas-liquid and gas-gas in the environment of superior dispersion, strong mixing and quick updating of the interface, and greatly enhancing the reactive process and the mass transfer separation process; 3. The application of the catalytic filler and wire gauze filler increases the contact area of the reaction, prolongs the reaction time of the gas-liquid in the rotor and improves the reactive speed and the mass transfer efficiency; 4. The application of the rotating liquid-distributor realizes the even distribution of the liquid from the liquid collection disc.

Integrating the reactive distillation apparatus for multistage counter-current rotating bed with the water separator, reboiler and the condenser to form a reactive distillation system of the rotating bed realizes the combination of the high gravity technology and the reactive distillation technology, and the reactive distillation process of the high gravity; synthesizing the n-butyl acetate via reactive distillation and taking it as an application system for studying, the liquid experiences several repeated movements as well as the smashing process during the process. This not only increases the heat transfer, mass transfer and the reactive contact area, but also improves the use efficiency of the catalyst, thus greatly enhancing the mass transfer and reactive process. Comparing with the traditional equipment of the reactive distillation column, the whole system features high utilization of the catalyst, high mass transfer efficiency, high conversion of the raw materials, compact equipment structure, small volume and so on.

In the figures: 1-revolving shaft, 2-shaft seal, 3-baseplate, 4-waste liquid outlet, 5-lower section of the shell, 6-liquid spray nozzle of the raw material, 7-feeding inlet, 8-inlet of the reflux, 9-outlet of the gas phase, 10-spray nozzle of the reflux, 11-top cover of the dynamic filler ring, 12-catalytic filler, 13-the top cover of the shell, 14-the static ring of the upper rotor, 15-upper section of the shell, 16-upper rotor, 20-lower rotor, 17-wire gauze filler, 18-inlet of the gas phase, 19-static ring of the lower rotor, 21-dynamic filler ring, 22-rotating liquid distributor, 23-multistage counter-current rotating bed, 24-reboiler, 25-flowmeter of the raw material liquid, 26-raw material tank, 27-flowmeter of the reflux, 28-raw material pump, 29-back-flowing pump, 30-water separator, 31-condenser, 32-holed cylinder, 33-inclined slot.

DETAILED DESCRIPTION OF THE INVENTION

Figure 1:
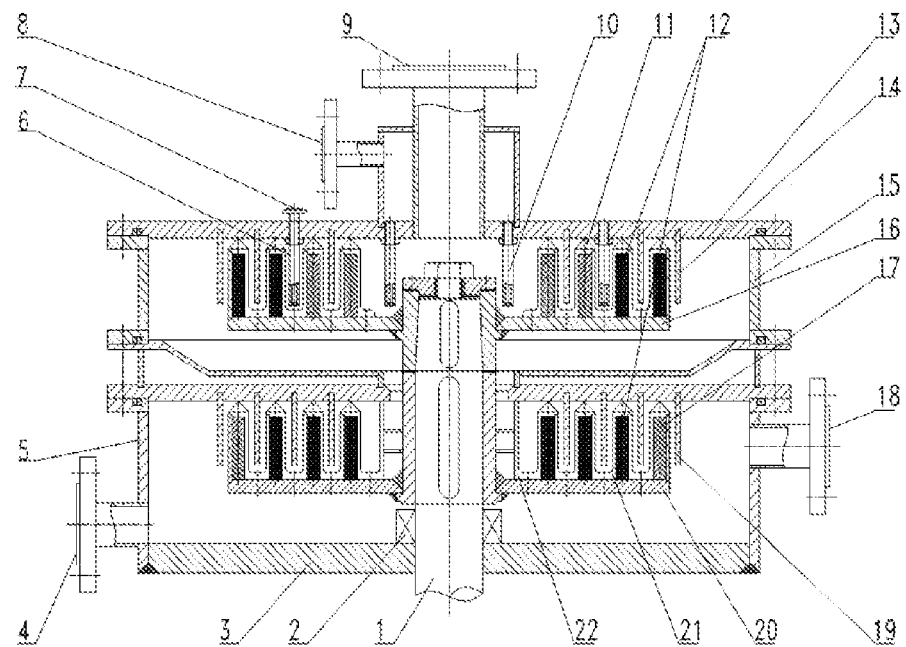
FIG. 1 is the schematic view of the structure of the reactive distillation apparatus for multistage counter-current rotating bed according to an embodiment of the present invention.

The reactive distillation apparatus for multistage counter-current rotating bed of the present invention as shown in FIG. 1 comprises a closed shell, wherein the shell is composed of the top cover of the shell 13, the upper section of the shell 15, the lower section of the shell 5 and the baseplate 3, a revolving shaft 1 linking the upper & lower sections of the shell is in the centre of the shell, a shaft seal 2 is installed between the revolving shaft and the baseplate. The shaft is equipped with tow or more than two rotors in series connection, as shown in FIG. 1, two rotors 16, 20 in series connection are respectively installed in the upper section of the shell and the lower section of the shell. A group of concentric dynamic filler rings 21 with different diameters are installed at intervals along the radial direction, wherein the wall of the dynamic filler rings is holed, the dynamic filler ring is filled with the filler, wherein the outer two circles of the upper rotor and the inner three circles of the lower rotor are filled with the catalytic filler 12, the inner three circles of the upper rotor and the outer one circle of the lower rotor are filled with the wire gauze filler 17. The clearance between various dynamic filler rings is installed with static rings firmly connected with the shell, the static rings are holed, the static ring 19 of the lower rotor is fastened on the top isolation plate of the lower section of the shell while the static ring 14 of the upper rotor is fastened on the top cover 13 of the shell. A rotating liquid distributor 22 is arranged in the inner circle of the innermost dynamic filler ring of the lower rotor. An inlet 8 of the reflux and a spray nozzle 10 of the reflux is arranged on the top cover of the shell; an outlet 9 of the gas phase is arranged in the middle of the top cover; a liquid spray nozzle 6 of the raw material is arranged on the location between the second circle of the upper rotor and the third dynamic filler ring corresponding to the top cover 13 of the upper section of the shell; a feeding inlet 7 is arranged on the surface of the top cover of the shell corresponding to the liquid spray nozzle of the raw material; a waste liquid outlet 4 and an inlet 18 of the gas phase are arranged on the lower shell.

Figure 2:
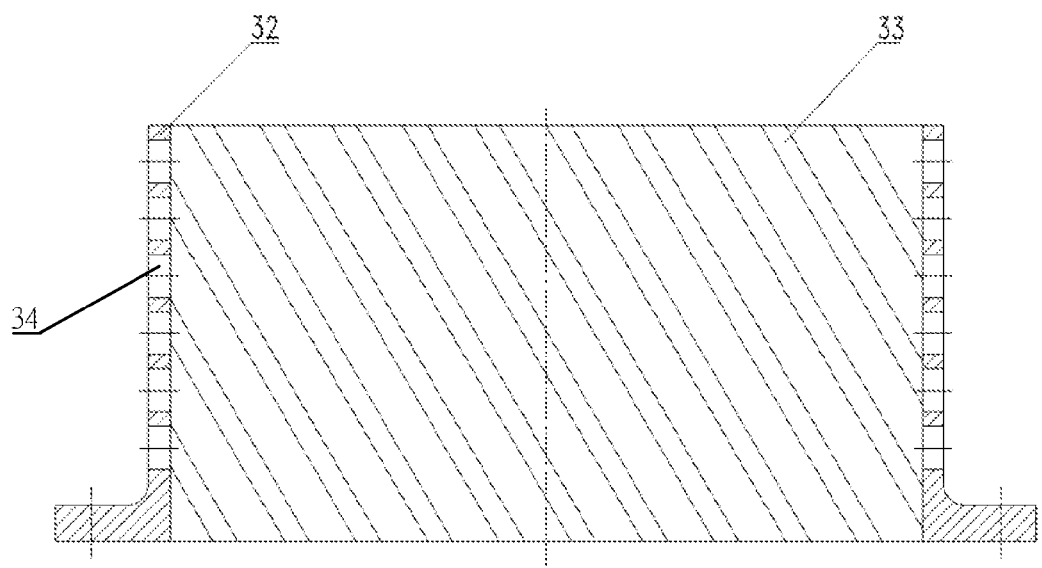
FIG. 2 is the schematic view of the structure of the cylindrical rotating liquid distributor according to an embodiment of the present invention.
Figure 3:
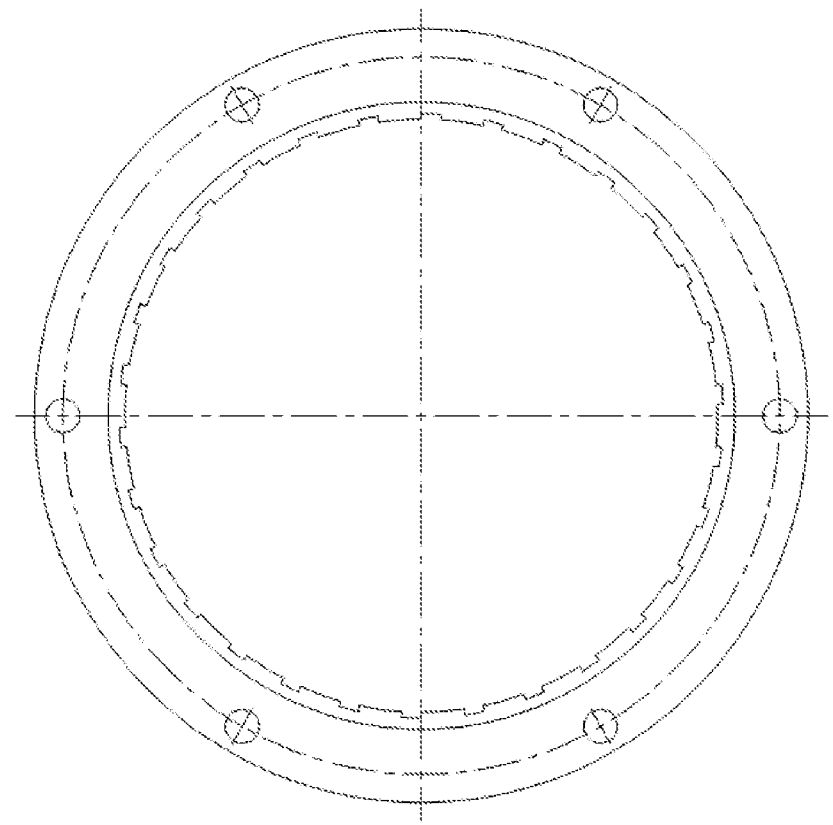
FIG. 3 is the top view of the structure of the cylindrical rotating liquid distributor of FIG. 2.
Figure 4:
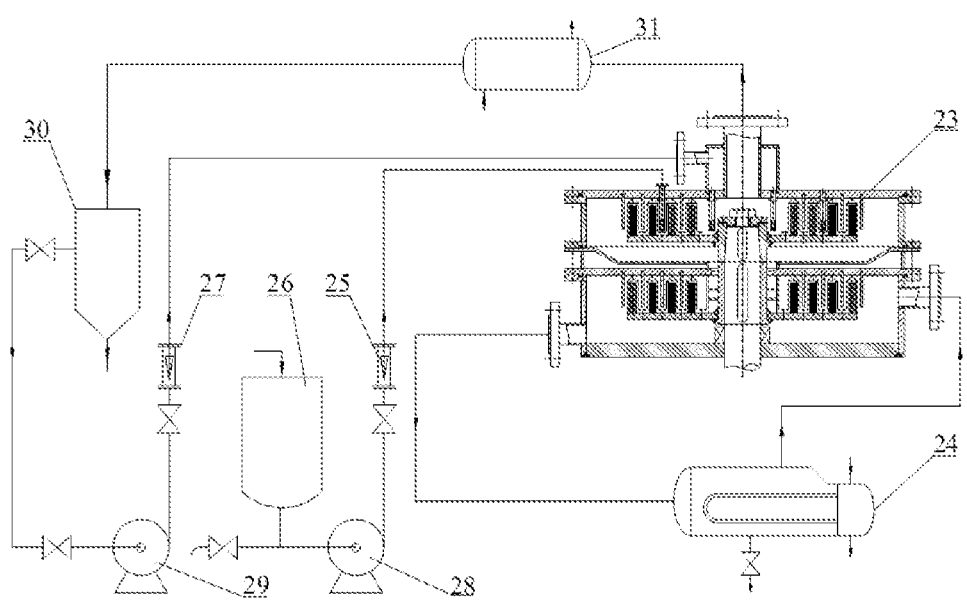
FIG. 4 is the systematic flow chart of the reactive distillation process of the rotating bed according to an embodiment of the present invention.

The rotating liquid distributor of the present invention is installed in the inner circle of the innermost dynamic filler ring of the said lower rotor is used to distribute the liquid evenly, as shown in FIG. 2, the distributor is a cylindrical-structural rotating liquid distributor with the inner wall of the holed cylinder 32 on the circumference having a inclined slot 33 which exerts axial force during the rotation of the slot onto the fluid, conducive to the even axial distribution of the fluid. The holed cylinder 32 has a plurality of holes 34.

The reactive distillation process of the present invention is as shown in FIG. 1, 4: the reactive distillation apparatus for multistage counter-current rotating bed 23 is combined with the reboiler 24, flowmeter of the raw material liquid 25, raw material tank 26, raw material pump 28, flowmeter of the reflux 27, reflux pump 29, water separator 30 and condenser 31 to form the reactive distillation system of the reactive distillation for multistage counter-current rotating bed. Synthesize the n-butyl acetate by using acetic acid and the butanol as the raw material via catalysis and the reactive distillation. Mix the raw materials according to a certain proportion and add them into the raw material tank 26, firstly preheat them to a certain temperature, via the raw material pump 28 and the flowmeter of the raw material liquid 25, make them enter the rotating bed 23 from the inlet 7 between the second circle and the third circle of the upper rotor, and spray them evenly onto the upper rotor from the liquid spray nozzle 6 of the raw material, afterwards, they are torn into the liquid film, liquid filament and liquid-drop of the size of a micron or nanometer by the great cutting force generated by the high speed rotation of the rotor, meanwhile they hit the surface of each catalytic filler at a high radial speed and then fully contact with catalyst for once reaction, after completing the surface updating and liquid redistribution through the wire gauze filler and the static rings, fall off after running into a device wall, flow into the reboiler 24 from the waste liquid outlet 4 at the bottom, wherein the steam rising from the reboiler mainly contains the ester-alcohol-water azeotrope and some acetic acid, afterwards, enter the rotating bed via the inlet 18 of the gas phase and the inner cavity under the pressure by passing the wire gauze filler and the catalyst in sequence, then fully contact with the lowered liquid phase due to the high speed rotation of the rotor, further fully contact with n-butyl acetate steam and acetic acid and then have a second reaction, thus more refined product can be prepared, the steam mixing the n-butyl acetate-water continues to ascend via the wire gauze filler, discharging to the condenser 31 from the outlet of the gas phase 9 in the center, and after condensation the liquid enters into the water separator 30 for proper organic phase-water separation; water separated by the water separator quickens the reactive system to go towards the right, while the organic phase flows into the rotating bed from the back-flowing pump 29, flowmeter 27 of the reflux and the inlet 8 of the reflux, sprays evenly onto the upper rotor from the spray nozzle 10 of the reflux, and is then collected by the upper shell after passing each filler layer and the static ring in the upper layer, enters into the inlet of the lower rotor after being collected by the liquid collection disc, then the liquid is distributed evenly to the filler of the lower rotor with the help of the rotating liquid distributor 22 and is collected by the lower shell, and then flows into the reboiler from the waste liquid outlet 4. During the process, a small amount of acetic acid and the butanol are reacted again, so the product prepared is further refined. Finally, the resultant crude ester goods can be obtained.

The present invention is further detailed by referring to the embodiments and figures, but the embodiments may not impose restrictions to the present invention.

Embodiment 1: add 30 L of the raw materials into the raw material tank with the acid-ester ratio being 1:1.1 and the quantity of the acetic acid being 190 mol, firstly preheat them to 105-110° C., activate the reactive distillation apparatus for the rotating bed, adjust the rotating speed of the rotating bed to 700 r/min so as to feed the mixture with 15 L/h into the rotating bed, spray them evenly onto the upper rotor from the spray nozzle of the raw material, after passing the catalyst layer and the wire filler layer in sequence, enter the reboiler from the waste liquid outlet. During the experiment, control the temperature of the column top to be 95° C. so as to make sure ester-alcohol-water azeotrope ascends to the water separator from the rotating bed cavity, control the temperature of the reboiler to be 115° C. so as to make sure the liquid in the reboiler can evaporate into the rotating bed for full reaction. In the process, in the high gravity environment formed by the high speed rotation of the rotor, the two reactants have more gas-liquid and liquid-liquid contacting on the catalyst surface, thus improving the conversion of the reactant; the steam in the reboiler is condensed in the condenser on the column top and then is discharged into the water separator. By regarding the appearance of the reflux in the water separator as the reactive starting point, after the liquid level of the water separator is stable, the organic phase flows back to the rotating bed with a flow rate of 10 L/h so as to make the small amount of alcohol in the product become further reacted and the product is further refined, then the water phase is constantly separated to make the reaction follow the product direction, while the system, by regarding the reaction without water generated as the reactive end (no rising or minimal change of the water-phase liquid level of the water separator), finally measures the conversion of acetic acid of the raw material to be as high as 88.5%.

Embodiment 2: as stated in Embodiment 1, with the other conditions unchanged, change the rotating speed of the rotating bed to 800 r/min, then the conversion of the raw material acetic acid measured in the experiment is 89%.

Embodiment 3: as stated in Embodiment 1, with the other conditions unchanged, change the rotating speed of the rotating bed to 600 r/min, then the conversion of the raw material acetic acid measured in the experiment is 85%.

Embodiment 4: as stated in Embodiment 1, with the other conditions unchanged, change the rotating speed of the rotating bed to 900 r/min, then the conversion of the raw material acetic acid measured in the experiment is 84.2%.

What is claimed is:

1. A reactive distillation apparatus for multistage counter-current rotating bed, comprising:

a closed shell including a top cover, an isolation plate, a baseplate, an upper section defined between the top cover and the isolation plate, and a lower section defined between the isolation plate and the baseplate, wherein the upper section and the lower section are arranged in an axial direction of the closed shell;

a revolving shaft provided along a vertical central axis of the closed shell and linking the upper section and the lower section;

two or more rotors in series connection connected to the revolving shaft, wherein the rotors comprise an upper rotor positioned in the upper section and a lower rotor positioned in the lower section, each of the rotors comprises a rotating disc connected with the revolving shaft, a group of concentric dynamic filler rings with different diameters are installed on the rotating disc at intervals along a radial direction, walls of the dynamic filler rings are holed;

static rings connected to the top cover and the isolation plate, respectively, wherein the static rings connected to the top cover are inserted into clearances between the dynamic filler rings of the upper rotor, the static rings connected to the isolation plate are inserted into clearances between the dynamic filler rings of the lower rotor, and walls of the static rings are holed;

a feeding inlet, a reflux inlet and a gas outlet mounted on a top face of the top cover of the closed shell, while a waste liquid outlet and a gas inlet provided in the lower section above the baseplate of the closed shell;

wherein the dynamic filler rings comprise a first filler ring filled with a catalytic filler and a second filler ring filled with a wire gauze filler with the first filler ring being positioned at an outer circle on the upper rotor and at an inner circle on the lower rotor, respectively, and the second filler ring being positioned at an inner circle on the upper rotor and at an outer circle on the lower rotor, respectively;

a spray nozzle for raw material liquid arranged between the first filler ring and the second filler ring on the upper rotor;

a spray nozzle for reflux arranged in an inner cycle of the innermost dynamic filler ring on the upper rotor; and a rotating liquid distributor arranged in an inner cycle of the innermost dynamic filler ring on the lower rotor.

2. The reactive distillation apparatus for multistage counter-current rotating bed as claimed in claim 1, wherein the catalytic filler is filled in a porous medium.

3. The reactive distillation apparatus for multistage counter-current rotating bed as claimed in claim 1, wherein the feeding inlet is arranged between the first filler ring and the second filler ring on the upper rotor corresponding to and in fluid communication with the spray nozzle for raw material liquid.

4. The reactive distillation apparatus for multistage counter-current rotating bed as claimed in claim 1, wherein porosity of the second filler ring is 50%-99%.

5. The reactive distillation apparatus for multistage counter-current rotating bed as claimed in claim 1, wherein porosity of the walls of the static rings is 40%-95%.

6. The reactive distillation apparatus for multistage counter-current rotating bed as claimed in claim 1, wherein the rotating liquid distributor comprises a cylindrical body surrounding the revolving shaft.

7. The reactive distillation apparatus for multistage counter-current rotating bed as claimed in claim 6, wherein sidewall of the cylindrical body of the rotating liquid distributor has holes and inclined slots are formed on inner surface of the sidewall of the cylindrical body of the rotating liquid distributor.

8. The application of the reactive distillation apparatus for multistage counter-current rotating bed as claimed in claim 1 in absorption, distillation, chemical reaction distillation, catalytic distillation, or purification and preparation of nano materials in the fields of chemical, petrochemical, pharmaceutical, or light industry.

9. The reactive distillation apparatus for multistage counter-current rotating bed as claimed in claim 1, wherein a shaft seat is installed between the revolving shaft and the baseplate.

10. The reactive distillation apparatus for multistage counter-current rotating bed as claimed in claim 1, wherein there are two first filler rings being positioned at the outer circle on the upper rotor and two second filler rings being positioned at the inner circle on the upper rotor, and there are three first filler rings being positioned at the inner circle on the lower rotor and one second filler ring being positioned at the outer circle on the lower rotor.

* * * * *